United States Patent
Napholz et al.

(10) Patent No.: US 12,198,523 B2
(45) Date of Patent: Jan. 14, 2025

(54) VEHICLE WITH AN OCCUPANCY DETECTION SYSTEM AND A METHOD FOR WARNING REGARDING A LIVING BEING FORGOTTEN IN A VEHICLE

(71) Applicant: MERCEDES-BENZ GROUP AG, Stuttgart (DE)

(72) Inventors: Bernd Napholz, Gaeufelden (DE); Florian Pfeiffer, Kirchheim (DE); Alper Akbilek, Munich (DE); Muhammad Manzar Hussain, Munich (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 38 days.

(21) Appl. No.: 18/035,783

(22) PCT Filed: Oct. 22, 2021

(86) PCT No.: PCT/EP2021/079411
§ 371 (c)(1),
(2) Date: May 8, 2023

(87) PCT Pub. No.: WO2022/096292
PCT Pub. Date: May 12, 2022

(65) Prior Publication Data
US 2024/0013642 A1   Jan. 11, 2024

(30) Foreign Application Priority Data
Nov. 9, 2020   (DE) ..................... 10 2020 006 878.2

(51) Int. Cl.
*B60Q 5/00*    (2006.01)
*G01S 13/04*   (2006.01)
(Continued)

(52) U.S. Cl.
CPC ............. *G08B 21/02* (2013.01); *B60Q 5/005* (2013.01); *G01S 13/04* (2013.01); *G01S 13/886* (2013.01)

(58) Field of Classification Search
CPC ......... G08B 21/02; B60Q 5/005; G01S 13/04; G01S 13/886; G01S 15/04
See application file for complete search history.

(56) References Cited

U.S. PATENT DOCUMENTS 6,388,410 B1   5/2002   Höhn
6,819,249 B1   11/2004  Papp
(Continued)

FOREIGN PATENT DOCUMENTS

DE   19947904 A1    5/2001
DE   102015015671 A1  7/2016
(Continued)

OTHER PUBLICATIONS

International Search Report and Written Opinion mailed Feb. 14, 2022 in related/corresponding International Application No. PCT/EP2021/079411.

(Continued)

*Primary Examiner* — John A Tweel, Jr.
(74) *Attorney, Agent, or Firm* — PATENT PORTFOLIO BUILDERS PLLC

(57) ABSTRACT

A vehicle includes an occupancy detection system made up of at least one computing unit and at least four antennae. The occupancy detection system is configured to transmit Wi-Fi radio signals by multiple-input multiple-output communication in an occupancy detection mode. At least two first antennae arranged inside the vehicle are configured to send out Wi-Fi packages and at least two further antennae arranged inside the vehicle are configured to receive these and to transmit them to the computing unit. The computing (Continued)

Figure 1:
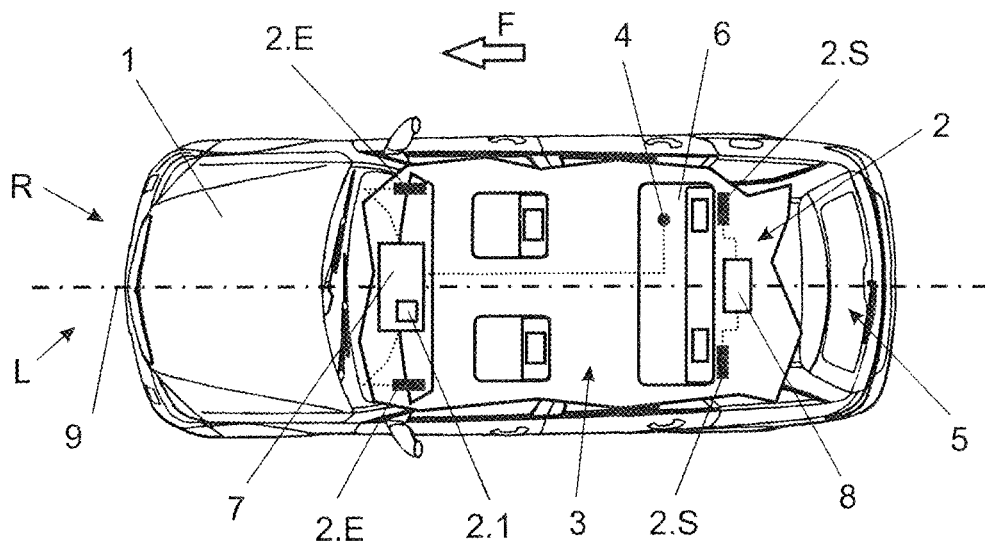

unit analyses the received Wi-Fi packages, taking into consideration a relation between sending and receiving antennae for investigating channel state information, to determine periodic variations in the channel state information in order to detect the presence of at least one living being in the vehicle.

8 Claims, 2 Drawing Sheets

(51) Int. Cl.
*G01S 13/88* (2006.01)
*G08B 21/02* (2006.01)

(56) References Cited

U.S. PATENT DOCUMENTS

| | | | |
|---|---|---|---|
| 6,960,990 B2* | 11/2005 | McKibbon | B60R 25/33 340/426.36 |
| 10,306,650 B2 | 5/2019 | Zielinski et al. | |
| 10,609,148 B1 | 3/2020 | Tran | |
| 11,598,838 B2* | 3/2023 | Oman | G01S 5/0284 |
| 2018/0065504 A1 | 3/2018 | Lan et al. | |
| 2018/0099592 A1 | 4/2018 | Curry | |
| 2019/0178980 A1 | 6/2019 | Zhang et al. | |
| 2020/0348406 A1 | 11/2020 | Jain et al. | |

FOREIGN PATENT DOCUMENTS

| | | |
|---|---|---|
| DE | 102016213689 A1 | 2/2018 |
| WO | 2017156492 A1 | 9/2017 |

OTHER PUBLICATIONS

Office Action created Oct. 18, 2021 in related/corresponding DE Application No. 10 2020 006 878.2.

* cited by examiner

VEHICLE WITH AN OCCUPANCY DETECTION SYSTEM AND A METHOD FOR WARNING REGARDING A LIVING BEING FORGOTTEN IN A VEHICLE

BACKGROUND AND SUMMARY OF THE INVENTION

Exemplary embodiments of the invention relate to a vehicle with an occupancy detection system, as well as to a method for warning regarding a living being forgotten in a vehicle.

After using a vehicle, it may happen that a vehicle user accidentally or intentionally leaves a living being, like a child or a pet, unattended in a parked vehicle. For example, dogs are quite often left alone in the vehicle by their owner, so that they can go shopping unhindered. This situation can become dangerous both for children and also for pets, in particular if the vehicle is parked in direct sunlight. The vehicle can thus heat up significantly in the sun, whereby the living being left behind in the vehicle can overheat or dehydrate.

To prevent such disastrous events, systems are desirable that monitor an interior of the vehicle and output a warning in the case of the intended or unintended leaving of a living being in the vehicle, if there is a serious health risk for the living being. Such systems are known from the general prior art. A first method thereby provides for monitoring a vehicle interior by means of radar sensors, typically with a frequency of 60 GHz, in order to detect the general presence of a living being in the vehicle. With the help of radar sensors, a high accuracy in the monitoring of the vehicle interior can be achieved, however the radar sensors require a direct line of sight to the living being to be detected. If the direct line of sight is interrupted, for example by means of pieces of luggage, then the radar sensors cannot detect the living being. Such systems are also comparatively expensive because corresponding radar sensors are integrated in a roof of a vehicle and must be connected to an infotainment system of the vehicle. It is further known to monitor a vehicle interior with the help of cameras. However, this represents an invasion of the privacy of the vehicle occupants. Further, child seats are known from the prior art, that comprise an in-built sensor for detecting the presence of a child. The seats are coupled with an app running on a mobile terminal and can output a warning to the mobile terminal of a person driving the vehicle if a child is accidentally forgotten in the vehicle. To this end it is, however, necessary that an owner of the vehicle buys and uses a corresponding child seat. Further, such child seats do not enable the detection of a pet left behind in the vehicle.

Further, the prior art discloses the detection of heartbeats and/or breathing of a living being by means of changes of a signal strength or a wireless radio signal, in particular of a Wi-Fi radio signal. WO 2017/156492 A1 thus discloses a method, a device, server, and a system for detecting and monitoring signs of life. With the device disclosed in the document or the system, it is possible to determine a breathing frequency of a person, a strength of the breathing of the person, as well as a number of breathing living beings in an enclosed space like a room. Further, it is also possible to determine a heartbeat of living beings. The method relies on a detection of a change of a signal intensity of a radio signal emitted by an antenna and received by a further antenna. In particular, the method is based on a use of the so-called multipath reception. Multipath reception is a phenomenon that occurs in an electromagnetic wave receiving receiver. The electromagnetic waves emitted from a transmitter are deflected on physical boundaries like walls, wet leaves, windows, metal sheets or also the chest of a person, and reflected to the receiver in different ways. A mixing of a signal transmitted directly from the transmitter to the receiver with the different temporally offset reflected echo signals thereby occurs. A course of a signal path course is thereby not only influenced by reflections, but rather also by means of refraction, scattering and/or diffraction. This interference with the signal path course of the signal sent via radio is so large that even the rising and falling of a chest of a breathing living being is measurable by means of recognizing variations of a radio signal intensity of the radio signal received by the receiver.

To this end, corresponding to the invention disclosed in the document, time series of pieces of channel state information of a multipath channel, by means of which a radio signal is transmitted, are determined and are examined by means of spectral analysis for the existence of periodic fluctuations. If there are periodic fluctuations, then there is at least one breathing living being in a space between the transmitter and receiver of the radio signal. To increase a sensitivity, the document thereby also discloses providing several transmitting and receiving antennae. The document proposes applying the disclosed invention for detecting and monitoring people. A recognition and monitoring of people can thus be used, for example for smart home applications or for detecting trapped people in a crisis situation, for example in a blocked mine. The inventors additionally propose identifying smuggled people with the help of the radio signal-based life form recognition. Thus, for example with a vehicle that is leaving a prison, the vehicle can be "screened" with a device according to the invention provided stationarily on the prison, whereby prisoners smuggled out of the prison can be recognized. The inventors also propose counting a number of people in a confined space with the help of the method disclosed in the document. It can thus, for example, be determined whether a maximum number of people has been exceeded. The invention can also be used for monitoring a health status. A breathing frequency and strength of patients can thus be monitored, in order to infer their well-being. As the radio signal, the document in particular describes the use of Wi-Fi.

Exemplary embodiments of the present invention are directed to a vehicle that is able to simply and efficiently investigate a passenger compartment of the vehicle for the presence of living beings in any location. Exemplary embodiments of the present invention are also directed to a method for outputting warnings relating to a living being forgotten in a vehicle.

The vehicle according to the invention comprises an occupancy detection system made up of at least one computing unit and at least four antennae. The occupancy detection system is thereby configured to transmit Wi-Fi radio signals by means of multiple-input multiple-output communication in an occupancy detection mode, wherein at least two first antennae arranged inside the vehicle send out Wi-Fi packages and at least two further antennae arranged inside the vehicle receive these and transmit them to the computing unit. The computing unit is in turn configured to analyze the received Wi-Fi packages, taking into consideration a relation between sending and receiving antennae, in order to determine periodic variations in the channel state information of the Wi-Fi radio signals. Should there be such periodic variations, then this confirms the presence of at least one living being situated in the vehicle.

An underlying method for analysis of the Wi-Fi radio signals in this case is carried out similarly to the WO text mentioned in the description introduction, which is hereby completely integrated in the present disclosure by means of this reference. A determination of a heartbeat and/or of breathing of a living being thereby occurs at least corresponding to the FIGS. 2 to 6 disclosed in the WO text, as well as to the sections of the description belonging to this. Precisely, a detection of breathing occurs according to the paragraphs 107 to 115 disclosed in WO 2017/156492 A1, the determination of a number of people occurs according to the paragraphs 116 to 117, and the assessment of a strength of breathing occurs according to the paragraphs 118 to 121, and the determination of a location of a breathing living being occurs according to the paragraphs 122 to 125.

The inventors of the present patent application have, however, managed to implement a mobile occupancy detection system and to provide this in a vehicle. Living beings situated in a vehicle can thus be found, independent of a location of the vehicle, in both a parked and also in a driving vehicle. As well as the mere determination of a presence of a living being, information about a state of health of the living being can additionally be gathered. With the help of the occupancy detection system, it is also possible to determine a breathing frequency and a breathing strength, as well as a pulse of a living being. If a living being has, for example, an elevated breathing and/or heart rate and if their breathing strength is weak, then this indicates a health-compromised living being.

An advantageous development of the vehicle provides that at least one sensor monitoring at least one section of a passenger compartment of the vehicle is provided, wherein the computing unit is further configured to receive sensor data produced by the at least one sensor and to take it into consideration for validating a living being that is in fact situated in the vehicle. A reliability with which living beings in the vehicle, in particular in the passenger compartment of the vehicle, are detected, can thereby increase. A sensor fusion of the sensor data produced with the at least one sensor and the information determined by means of analysis of the Wi-Fi radio signals about a living being situated in the vehicle thus, for example, occurs.

According to a further advantageous embodiment of the vehicle, the at least one sensor is a temperature sensor, pressure sensor, microphone, radar sensor, ultrasound sensor, and/or a camera. The vehicle can thus comprise only one of the sensors, or also several or all of the sensor types, and can thereby also have one or more sensors of every sensor type. With the help of the temperature sensor, an interior temperature of the passenger compartment can, for example, be monitored, whereby a thermal signature of a living being can be determined, whereby, in turn, the presence of the living being can be inferred. This is also possible by means of analysis of the sensor data of a pressure sensor. For example, one or more pressure sensors are integrated into seats of the vehicle. By means of recognizing a stationary or dynamic weight on at least one of the vehicle seats, the presence of a living being on the corresponding vehicle seat can be inferred. Noises can also be detected and analyzed with the help of a microphone. For example, the recognition of a breathing noise or the recognition of voices or dog barking indicates that there is a person situated in the vehicle or a dog situated in the vehicle. Similar to the described prior art, the sensor can also be formed as a radar sensor, ultrasound sensor, or as a camera. In particular, the camera can be an infra-red camera, whereby a thermal signature of a living being in the passenger compartment can be determined even more reliably.

A further advantageous embodiment of the vehicle further provides that at least two antennae are arranged in a front area of the vehicle, in particular behind a dashboard in the direction of travel, and at least two antennae are arranged in a rear area of the vehicle, in particular on a side of a vehicle back seat facing a trunk, wherein at least two antennae are respectively arranged in a right and a left half of the vehicle in the direction of travel. Especially advantageously, the vehicle already comprises several antennae by default. For providing comfort functions, an on-board Wi-Fi network can already be set up in many modern vehicles. In order to enable a Wi-Fi signal strength that is as high as possible, with an interference and noise that is as low as possible, the Wi-Fi antennae are thereby arranged in corners of the passenger compartment. One Wi-Fi antenna is thus situated in the front left corner, one in a front right corner, one in a back left corner and one in a back right corner of the passenger compartment, or of the vehicle. The antennae are thereby arranged in the vehicle in such a way that they do not spoil an aesthetic image of the vehicle. In particular, the antennae are hidden behind a screen, for example the dashboard or a seat structure. It is thus possible to produce an especially strong Wi-Fi signal in the passenger compartment, and to thereby not spoil the aesthetic of the vehicle. Using hardware already available in the vehicle, the occupancy detection system can thus be especially simply integrated into the vehicle.

According to a further advantageous embodiment of the vehicle, the computing unit forms a transmitter and/or a receiver. It is thus possible that both the emitting and also the receiving antennae are connected to the computing unit. It is, however, also possible that the emitting or the receiving antennae are connected with a further computing unit. Because received Wi-Fi packages must be analyzed to detect a living being situated in the passenger compartment of the vehicle, where receiving antennae are connected with a further computing unit, the further computing unit is connected with the computing unit via a datalink, for example a databus, in order to pass on the received Wi-Fi packages to the computing unit for analysis. The number of variants is hereby increased in the formation of the occupancy detection system. In particular, the occupancy detection system can be inserted in a plurality of different vehicles, regardless of vehicle type, depending on what number and types of computing units a respective vehicle is equipped with.

Preferably, the computing unit is integrated in a head unit of the vehicle forming a Wi-Fi access point and the transmitter is formed by a telematics unit. An especially simple integration of the occupancy detection system into the vehicle is thereby possible. A modern vehicle thus typically comprises a head unit, which is able to form a Wi-Fi access point, as well as a telematics unit, with which odometry data of the vehicle can be monitored. In this case, the head unit pings the telematics unit, so that the telematics unit transmits the Wi-Fi package to the head unit. The computing unit integrated into the head unit subsequently analyses the received Wi-Fi packages regarding the channel state information.

The invention also discloses a method that is independent of a vehicle for warning regarding a living being forgotten in a vehicle. At least one receiver thereby receives at least one radio signal, transmitted via a multipath channel and influenced by the presence of the living being. A time series of pieces of channel state information of the at least one radio signal is extracted for the multipath channel and a spectral analysis of the channel state information is carried out for receiving periodic variations. By means of determining at least one periodic variation in the channel state information, it is concluded that at least one living being is present. The basic method for detecting a living being by means of analysis of channel state information of a radio signal thereby also occurs similarly to in the WO text discussed in the prior art. According to the invention, the method is, however, characterized by the following further method steps:

activation of an occupancy detection mode in a computing unit of the vehicle;

transmission of Wi-Fi radio signals by means of multiple-input multiple-output communication, wherein at least two antennae arranged inside the vehicle send out Wi-Fi packages and these are received by at least two further antennae arranged inside the vehicle and are transmitted to the computing unit;

analysis of the received Wi-Fi packages on the computing unit to examine the channel state information, wherein a relation between sending and receiving antennae is taken into consideration;

recognition of the presence of at least one living being by means of determining at least one periodic variation in the channel state information; and initiation of an alert action by means of the computing unit.

With the help of the method according to the invention, the risk for living beings forgotten in a vehicle, like children or pets, can be reduced. A number of injured or killed living beings, for example due to heat stroke in a greatly heated up vehicle parked in blazing sunshine, can thereby be reduced. It is thereby additionally possible that, after the presence of a living being has been determined, for example by means of an analysis of a breathing frequency and a breathing strength of the detected living being, it is determined what kind of living being it is. It can thus be determined whether the living being is a child or an adult person, as well as pets like dogs.

An advantageous embodiment of the method provides that the computing unit, at least taking into consideration a span of time elapsed after activation of the occupancy detection mode and/or a passenger compartment temperature, initiates at least one of the following actions:

outputting an acoustic and/or visual warning by means of a noise device and/or light device of the vehicle;

outputting occupancy information to an authorized person, and in particular by means of placing a call or sending a message to a mobile phone of the authorized person and/or activating and regulating an air-conditioning device of the vehicle;

placing an emergency call and/or sending an emergency message to an emergency rescue authority.

By means of analysis of the period of time elapsed after activating the occupancy detection system and/or the temperature of the passenger compartment, a potential danger to the living being forgotten in the vehicle can be determined. The longer the vehicle with the living being is left standing unattended, the greater is the danger that the forgotten living being becomes dehydrated. If the temperature in the passenger compartment additionally increases greatly, this accelerates a potential appearance of symptoms of dehydration. Depending on a level of the determined potential danger, different actions can be carried out. If only a comparatively short period of time has elapsed and/or the temperature of the passenger compartment has only risen minimally, then the acoustic and/or visual warning can initially be output. To this end, warning flashing devices, for example comprised by the vehicle, and/or headlights can be activated, and a horn of the vehicle can be operated. Passersby situated near the vehicle are thereby warned and can investigate the vehicle more closely, in order to determine the state of health of the living being forgotten in the vehicle. If more time passes and/or the temperature in the passenger compartment rises more sharply, and if there is no help for the living being forgotten in the vehicle by warned passersby, then information about the presence of the living being forgotten in the vehicle can be sent to the authorized person. The authorized person is, for example, an owner and/or a driver of the vehicle. Additionally, or alternatively, the air-conditioning device of the vehicle, for example in the form of climate control, can also be activated, in particular in order to cool the passenger compartment. A time period until the living being forgotten in the vehicle experiences health issues can thereby be increased. If the authorized person does not return to the vehicle, in order to get the living being forgotten in the vehicle out of the vehicle, then it is also possible that an automated emergency call is set off. For example, the police, fire brigade, and/or a rescue service can thus be informed. It can hereby be ensured that the living being forgotten in the vehicle can be got out of the vehicle.

Additionally, sensor data produced by further sensor types can be taken into consideration for determining the potential danger. For example, a state of health of a living being, as well as a monitoring of a breathing frequency and strength, as well as its pulse can also be assessed by means of an analysis of a skin temperature of the living being detected with an infra-red camera. It is also possible that a driver of a vehicle wanted the living being to be left alone in the vehicle. Such a scenario for example occurs, if the driver leaves their dog behind in the vehicle, in order to go shopping. In this case, the state of health of the dog can be monitored and a warning can then only be output to the authorized person or third party, if the state of health of the dog is endangered. The outputting of unnecessary warnings can hereby be prevented. In this case, such a function for outputting a warning can only be permanently active if there is a health problem for the living being expected in the near future, or it can only be activated by entering a control action.

Preferably, the computing unit checks a sensor type of at least one sensor monitoring at least one section of a passenger compartment of the vehicle, whereupon the occupancy detection mode is adapted by the computing unit, depending on the available sensor types. As already mentioned, by means of the integration of further sensor types like temperature sensors, pressure sensors, microphones, cameras, or similar, a reliability with which the living being that is in fact forgotten in the vehicle can be recognized can increase. Different vehicle types thereby do not, however, comprise all mentioned sensor types. It can thus occur that different sensor types are part of the optional extras of a vehicle. So that the method according to the invention can be safely applied when there are also different sensor types situated in the vehicle, the occupancy detection mode, in particular in the form of a computer program product like a piece of software or an app that forms the occupancy detection mode, can adapt to the sensor types actually available in the vehicle. The occupancy detection mode can thereby be especially simply integrated into different vehicle types, without the necessity of having to adapt the corresponding computer program product.

Further advantageous embodiments of the vehicle according to the invention and of the method according to the invention also arise from the exemplary embodiments, which are described in more detail in the following, with reference to the figure.

BRIEF DESCRIPTION OF THE DRAWING FIGURES

Figure 2:
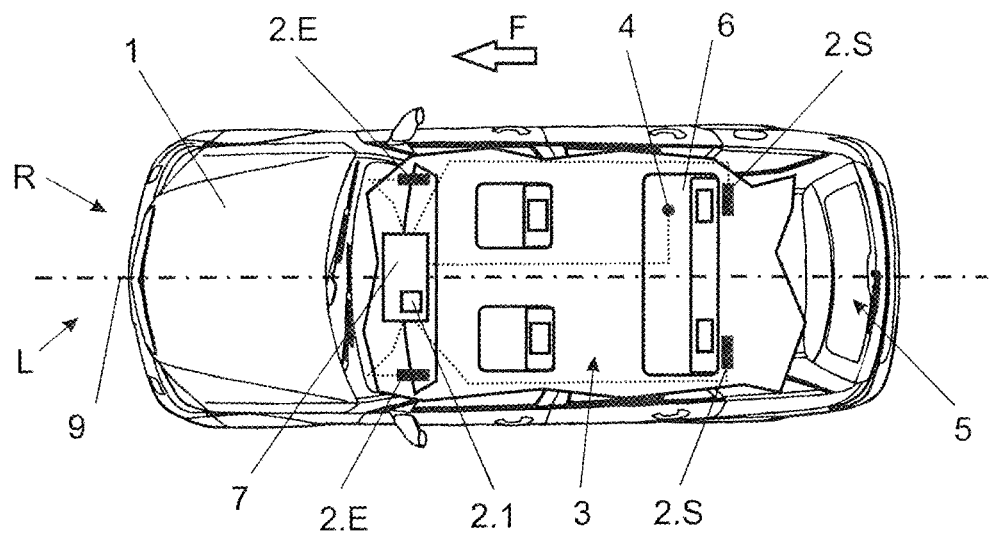
Figure 3:
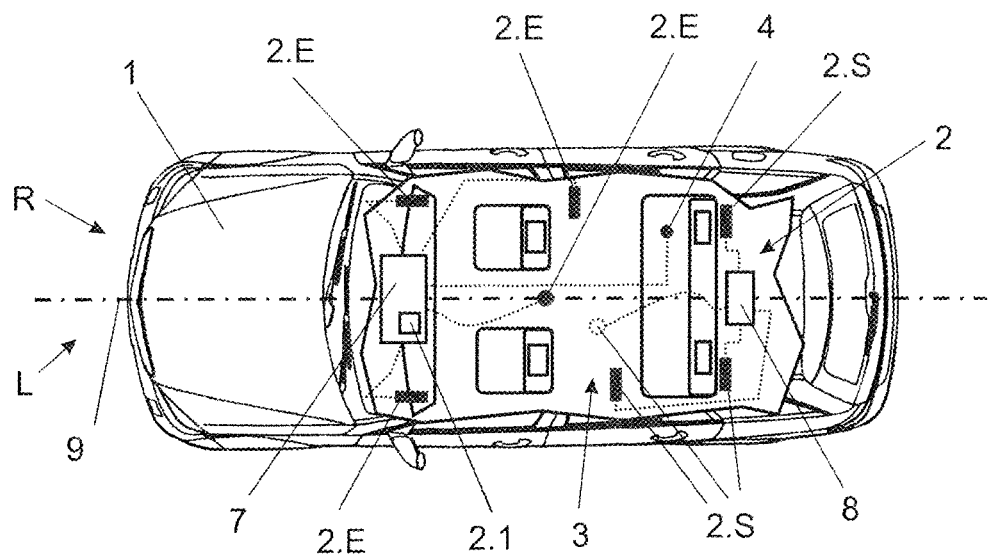

Here are shown:

FIG. 1 a plan view of a vehicle according to the invention with an occupancy detection system according to a first embodiment;

FIG. 2 a plan view of a further vehicle with an occupancy detection system according to an alternative embodiment; and FIG. 3 a plan view of a further vehicle with an occupancy detection system according to a further alternative embodiment.

DETAILED DESCRIPTION

FIG. 1 shows a vehicle 1 with an occupancy detection system 2. This comprises a computing unit 2.1 and several antennae 2.S, 2.E, of which, in the example in FIG. 1, two antennae 2.S emit radio signals and two antennae 2.E receive the radio signals. The radio signals are Wi-Fi packages, which are transmitted via a multipath channel. In this way, both antennae 2.E receive the Wi-Fi radio signals, which are transmitted by the two antennae 2.S. The antennae 2.S, 2.E are arranged in a passenger compartment 3 of the vehicle 1. The two receiving antennae 2.E are thereby situated in a front area of the vehicle 1, viewed in the direction of travel F, and the two transmitting antennae 2.S are thereby situated in a rear area of the vehicle 1, for example on a side behind a vehicle back seat 6 facing a boot 5 of the vehicle 1. Further, a center line 9 partitions the vehicle 1 into a right half of the vehicle R and a left half of the vehicle L. In the example in FIG. 1, one sending and one receiving antenna 2.S and 2.E are arranged in the right half of the vehicle R and in the left half of the vehicle L respectively. Therefore, at least one antenna 2.S, 2.E is provided in each corner of the passenger compartment 3 of the vehicle 1, whereby an especially strong network coverage can be created inside the passenger compartment 3.

The vehicle 1 additionally comprises a sensor 4, here in the form of a pressure sensor, which is integrated into a vehicle back seat 6 of the vehicle 1. With the help of the sensor 4, a reliability with which living beings in the vehicle 1 are detected can be increased. The sensor 4, here in the form of the pressure sensor, thus detects, for example, a person sitting on the vehicle back seat 6. Here, the person is not represented in the Figure.

The vehicle 1 comprises a head unit 7 and a telematics unit 8. According to FIG. 1, the occupancy detection system 2 can be especially simply integrated into the vehicle 1, in that the computing unit 2.1 is integrated into the head unit 7 of the vehicle 1. Especially preferably, hardware components that are already situated in the vehicle 1 can be used for forming the occupancy detection system 2. The head unit 7 thereby forms a Wi-Fi access point, over which the antennae 2.S, which are connected to the telematics unit 8, are pinged, so that they emit the Wi-Fi packages. The Wi-Fi packages are then received by the antennae 2.E, and are passed on to the computing unit 2.1 for analysis. The computing unit 2.1 thereby analyzes channel state information with which the Wi-Fi packages are affected, wherein periodic variations in the channel state information can be determined by means of carrying out a spectral analysis of the channel state information. If there are such periodic variations, this indicates the presence of a living being (not shown) in the vehicle 1, in particular in the passenger compartment 3.

In the vehicle 1 in FIG. 2, the emitting antennae 2.S are also connected to the head unit 7, or to the computing unit 2.1. The occupancy detection system 2 can thereby also be integrated into vehicle 1, that do not have a telematics unit 8.

The vehicle 1 in FIG. 3 comprises more than four antennae 2.S, 2.E, whereby an even stronger or less strongly affected Wi-Fi network coverage can be produced in the passenger compartment 3. An antennae 2.E is thereby integrated into a roof of the vehicle 1 and an antennae 2.E is thereby integrated into a floor of the passenger compartment 3. Generally, the vehicle 1, or the occupancy detection system 2, can comprise any number of antennae, as long as at least four antennae are provided. The bigger the number of receiving antennae 2.E, the more energy can be taken from an electromagnetic field. Since the passenger compartment 3 is comparatively small, the reflections on a propagation path of the Wi-Fi radio signals are comparatively large in number and strong, which leads to a multipath propagation, which can lead to a destructive difference and signal loss for the receiving antennae 2.E. Because several spatially separated receiving antennae 2.E are provided, negative effects caused by multipath propagation can be reduced or compensated. This effect is also known as spatial diversity.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A vehicle, comprising:
an occupancy detection system, comprising
at least one computing unit; and
at least four antennae,
wherein the occupancy detection system is configured to transmit Wi-Fi radio signals by using multiple-input multiple-output communication in an occupancy detection mode,
wherein at least two first antennae of the at least four antennae are arranged inside the vehicle and are configured to transmit Wi-Fi packages,
wherein at least two further antennae of the at least four antennae are arranged inside the vehicle and are configured to receive the transmitted Wi-Fi packages and configured to transmit the received Wi-Fi packages to the computing unit, wherein the computing unit is configured to analyze the received Wi-Fi packages, taking into consideration a relation between the at least two first antennae and the at least two further antennae, to obtain channel state information and to determine periodic variations in the channel state information in order to detect the presence of at least one living being in the vehicle, wherein the at least two further antennae are arranged in a front area of the vehicle behind a dashboard in a direction of travel, and wherein the at least two antennae are arranged in a rear area of the vehicle on a side of a vehicle back seat facing a trunk, wherein antennas of the at least two antennae and antennas of the at least two further antennae are respectively arranged in a right and a left half of the vehicle in a direction of travel.

2. The vehicle of claim 1, further comprising:

at least one sensor configured to monitor at least one section of a passenger compartment of the vehicle, wherein the computing unit is further configured to receive sensor data produced by the at least one sensor and to take the received sensor data into consideration for validating a living being that is situated in the vehicle.

3. The vehicle of claim 2, wherein the at least one sensor is a temperature sensor, pressure sensor, microphone, radar sensor, ultrasound sensor, or camera.

4. The vehicle of claim 1, wherein the computing unit includes a transmitter or a receiver.

5. The vehicle of claim 4, wherein the computing unit is integrated in a head unit of the vehicle forming a Wi-Fi access point and the transmitter is formed by a telematics unit of the vehicle.

6. A method for warning regarding a living being forgotten in a vehicle, the method comprising:

activating an occupancy detection mode in a computing unit of the vehicle;

transmitting Wi-Fi radio signals including Wi-Fi packages using multiple-input multiple-output communication via, at least two antennae arranged inside the vehicle and arranged in a rear area of the vehicle on a side of a vehicle back seat facing a trunk;

receiving, by at least one receiver via at least two further antennae arranged inside the vehicle and arranged in a front area of the vehicle behind a dashboard in a direction of travel, at least one radio signal including the Wi-Fi packages and transmitted via a multipath channel and influenced by presence of the living being;

extracting, for the multipath channel, a time series of pieces of channel state information of the at least one radio signal;

performing a spectral analysis of the channel state information for receiving periodic variations; and determining that at least one living being is present in the vehicle based on at least one periodic variation in the channel state information by the computing unit analyzing the received Wi-Fi packages to examine the channel state information, wherein a relation between the at least two antennae and the at least two further antennae is taken into consideration in the analyzing of the received Wi-Fi packages; and initiating, by the computing unit responsive to the determination that the at last one living being is present in the vehicle, an alert.

7. The method of claim 6, wherein the computing unit, at least taking into consideration a span of time elapsed after activation of the occupancy detection mode or a passenger compartment temperature, initiates at least one of the following as the alert:

outputting an acoustic or visual warning by a noise device or light device of the vehicle, respectively, outputting occupancy information to an authorized person by placing a call or sending a message to a mobile phone of the authorized person, activating and regulating an air-conditioning device of the vehicle, or placing an emergency call or sending an emergency message to an emergency rescue authority.

8. The method of claim 6, wherein the computing unit checks a sensor type of at least one sensor monitoring at least one section of the passenger compartment of the vehicle and adapts the occupancy detection mode depending on available sensor types.

* * * * *